C. A. A. RAND.
TONGUE TRUCK.
APPLICATION FILED JUNE 2, 1910.
994,787.
Patented June 13, 1911.
2 SHEETS—SHEET 2.
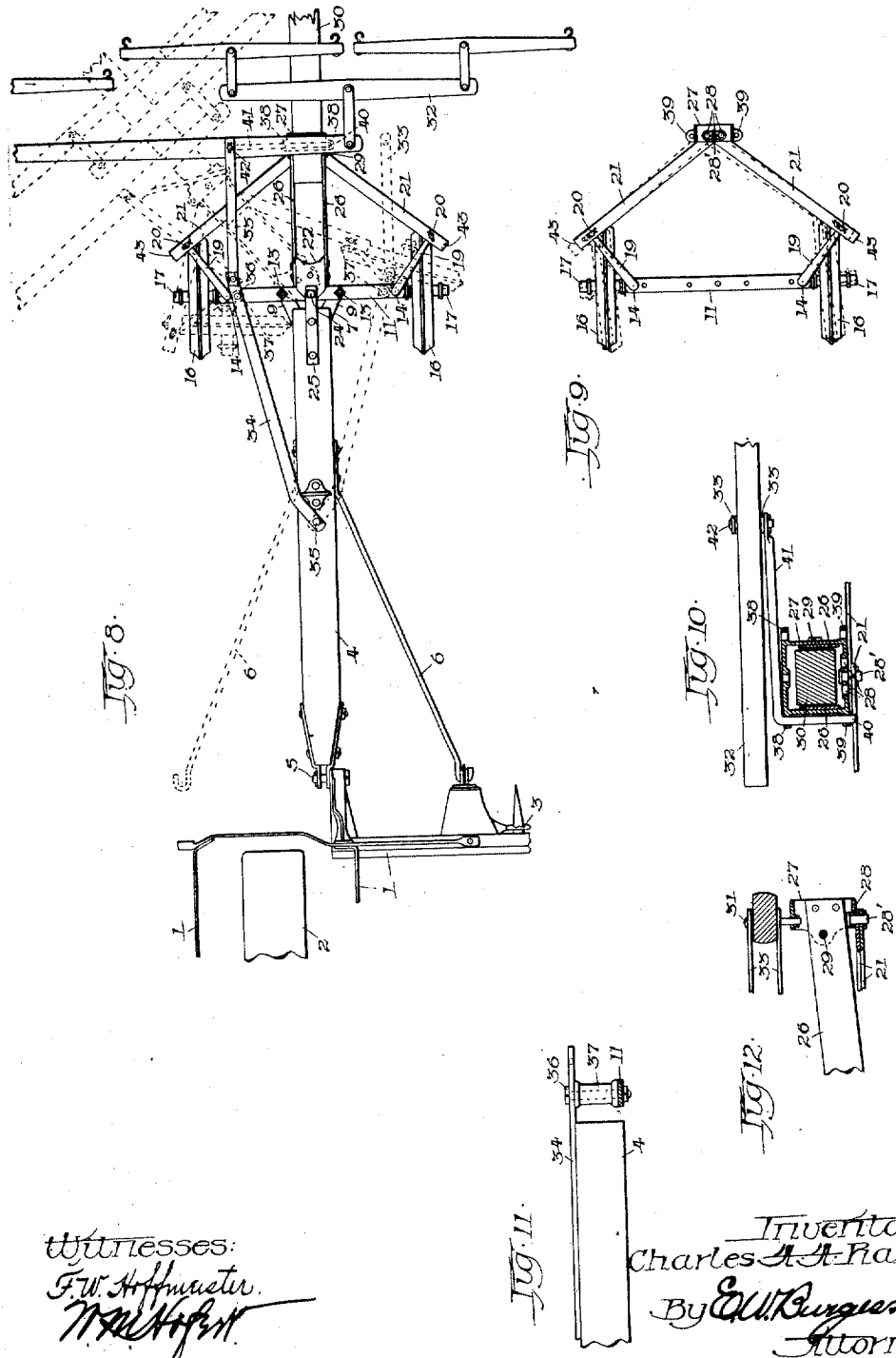
Witnesses:
F. W. Hoffmeister
Inventor
Charles A. A. Rand
By E. W. Burgess
Attorney

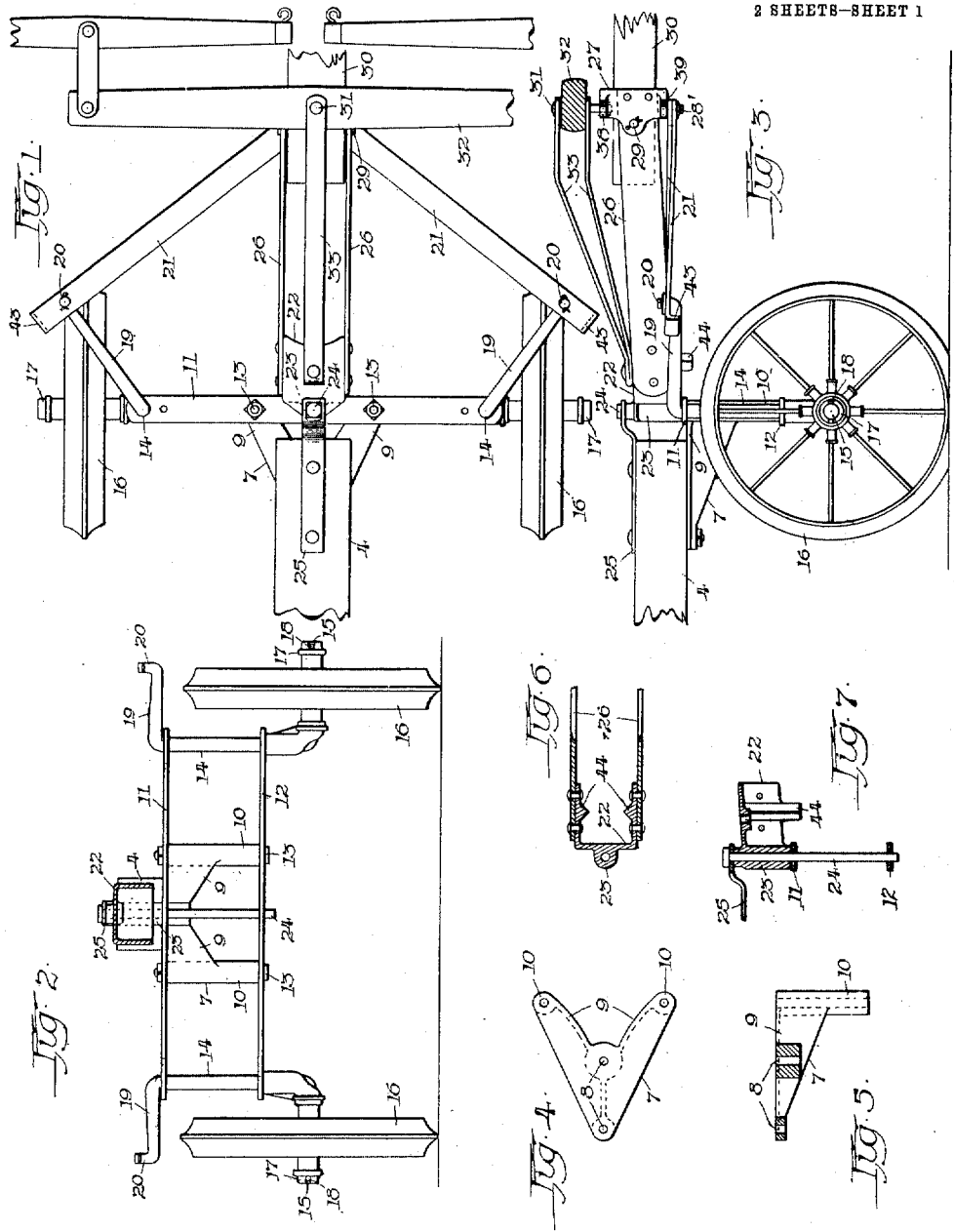

UNITED STATES PATENT OFFICE.

CHARLES A. A. RAND, OF CHICAGO, ILLINOIS, ASSIGNOR TO INTERNATIONAL HARVESTER COMPANY, A CORPORATION OF NEW JERSEY.

TONGUE-TRUCK.

994,787.  Specification of Letters Patent. Patented June 13, 1911.

Application filed June 2, 1910. Serial No. 564,538.

*To all whom it may concern:*

Be it known that I, CHARLES A. A. RAND, a citizen of the United States, residing at Chicago, in the county of Cook and State of Illinois, have invented certain new and useful Improvements in Tongue-Trucks, of which the following is a specification.

My invention relates to tongue trucks for use in connection with harvesting machines or tillage implements having a stub tongue as a part of their equipment; the object of my invention being to provide a construction of truck which will be equally adapted for use in connection with either a right-hand or a left-hand cut harvester, and with or without a draft tongue connection, and also one that will turn freely and cause the wheels thereof to travel in properly defined lines, whereby all liability of a cramping or braking movement of the wheels is effectively prevented. I attain these objects by means of the mechanism illustrated by the accompanying drawings, in which—

Figure 1 is a top plan view of my improved truck with the stub tongue and draft tongue broken away; Fig. 2 is a front elevation, partly in section, of Fig. 1; Fig. 3 is a side elevation of Fig. 1; Fig. 4 is a plan view of a detail part of the truck mechanism; Fig. 5 is a sectional elevation of Fig. 4; Fig. 6 is a sectional plan view of part of the draft mechanism; Fig. 7 is a vertical section of Fig. 6 and some of its associated parts; Fig. 8 is a top plan view of the truck illustrating the manner of attaching it to a harvester, the full lines being designed to show the manner of connecting it with a right-hand cut machine and dotted lines with a left-hand cut, also showing the position of the various parts during the turning operation of the mechanism; Fig. 9 represents a top plan view of part of Fig. 8; Fig. 10 represents an end elevation of a detail part of the draft connections, partly in section; Fig. 11 represents a detail part of the adjustable draft connection between the truck axle and the stub tongue of a harvester; and Fig. 12 is a side elevation, partly in section, of other draft members forming a part of the associated mechanism.

The same reference numerals designate like parts throughout the several views.

1 represents the front side of a harvester platform and wheel frame, 2 the traction wheel, 3 a part of the cutting apparatus in connection with a "right-hand cut harvester," a common name to distinguish this type of machine, and 4 a stub tongue having its rear end connected with the wheel frame by means of a pin 5 and a brace member 6.

Secured to the forward end of the stub tongue, upon its lower side, is a bracket 7, having vertically arranged openings 8, by means of which it is secured to the stub tongue, and forwardly diverging arms 9, having vertically arranged sleeves 10 at their forward ends, and 11 and 12 represent upper and lower relatively fixed truck axle members, respectively, that are secured to the sleeves 10 by means of bolts 13. The axle members are provided with vertical openings at their outer ends that form bearings for rocking wheel supporting shafts 14, that are provided at their lower ends with outwardly turned arms 15, upon which are journaled truck wheels 16, that are held thereon by means of washers 17 and pins 18, and 19 represents forwardly diverging crank arms at the upper ends of the shafts, having vertically arranged portions 20 at their outer ends, to which are pivotally connected the rear ends of controlling bars 21.

22 represents a bracket member having a vertically arranged sleeve 23 at its rear end, by which it is pivotally connected with the upper axle member by means of a pin 24, the pin being supported at its upper end by the strap 25 secured to the stub tongue of the harvester.

26 represents forwardly extending truck tongue members having their rear ends secured to opposite sides of member 22, and their forward ends to opposite sides of a box bracket 27, the bottom wall of which is provided with a series of vertical openings 28 for the reception of a pin 28', that connects the forwardly converging ends of controlling bars 21 therewith.

29 represents a transversely arranged pin received by openings in the side walls of the box bracket and by means of which a truck guiding tongue 30 may be pivotally connected therewith if desired.

A pin 31 is received by a vertical opening in the upper wall of the box bracket, upon which is pivoted a draft evener 32, and 33 represent rearwardly extending straps having openings in their forward ends for the reception of pin 31, the evener being disposed between the straps, the rear ends of which are secured to the truck tongue member 22.

34 represents a brace member having its rear end secured to the stub tongue of the harvester by means of a bolt 35 and its forward end to the upper axle member by means of a bolt 36 and spacing thimble 37.

Box bracket 27 is provided upon opposite sides thereof with upper and lower outwardly projecting ears 38 and 39, having vertical openings therein for the reception of a depending leg 40, forming part of the swinging link 41, operative as a support for the draft evener, which may be pivotally connected with the outer end thereof, as shown in Figs. 8 and 10, by means of a pin 42, either at the left-hand side of the stub tongue when used in connection with a right-hand cut harvester, as shown in full lines in Fig. 8, or in connection with a left-hand cut harvester, as shown by dotted lines in same figure, the straps 33 being transferable from the positions shown in Figs. 1 and 3 to those shown in Fig. 8 and having their rear ends pivotally connected with the forward end of brace member 34, the construction of parts being such as to permit the draft evener to be used in connection with two draft animals to be connected centrally relative to the tongue members, as shown in Figs. 1 and 3, and at either side thereof when used in connection with three draft animals, or with a right or left-hand cut harvester, as shown in Fig. 8.

The rear ends of the controlling bars 21 are provided with turned down portions 43 that are adapted to contact with the crank arms 19 in a manner to limit a lateral swinging movement of the truck tongue member, as shown by full lines in Fig. 3 and by dotted lines in Fig. 8, and 44 represents depending legs forming part of the truck tongue member 22, that are adapted to contact with the upper axle thereof for the same purpose. The series of vertical openings 28 in the lower wall of box bracket 27 are for the purpose of permitting an adjustment of the forward ends of the controlling bars 21 that is right or left of or central with the line of draft of the machine in a forward direction, whereby the angle of the truck wheels relative to the line of draft may be varied in the same direction and in substantially parallel planes in a manner to counteract any tendency to side draft of the harvester.

What I claim as my invention, and desire to secure by Letters Patent, is:

1. A tongue truck for implements including, in combination, a relatively fixed axle member, vertically arranged shafts having bearings at opposite ends of said fixed axle member and provided with laterally projecting stub axle members at their lower ends, and laterally projecting crank arms at their upper ends, wheels journaled upon said stub axle members, a truck tongue member pivotally connected with said fixed axle member in a manner permitting said tongue to swing laterally relative to the line of draft, and links having their inner ends pivotally connected with said truck tongue member in coaxial relation and their opposite ends pivotally connected with said crank arms, the inner adjacent ends of said links being adjustable together laterally in the same direction upon said truck tongue member relative to the line of draft, whereby the angle of the path of said wheels may be varied to a limited extent in the same direction and in substantially parallel planes.

2. A tongue truck for implements including, in combination, a relatively fixed axle member including upper and lower bars spaced apart in parallel relation, vertically arranged shafts having bearings at opposite ends of said axle member and provided with laterally projecting stub axle members at their lower ends and laterally projecting crank arms at their upper ends, wheels journaled upon said stub axle members, a spacing bracket member secured to said axle members intermediate their ends and having a portion projecting rearward at right angles thereto, a stub tongue secured to said projecting portion, a truck tongue member having its rear end pivotally connected with said fixed axle member in a manner permitting said tongue to swing laterally relative to the line of draft, and links having their inner ends pivotally connected with the front end of said truck tongue member in coaxial relation and their opposite ends pivotally connected with said crank arms, the inner adjacent ends of said links being adjustable together laterally in the same direction upon said truck tongue member relative to the line of draft, whereby the angle of the path of said wheels may be varied to a limited extent in the same direction and in substantially parallel planes.

3. A tongue truck for implements including, in combination, a relatively fixed axle member including upper and lower bars spaced apart in parallel relation, vertically arranged shafts having bearings at opposite ends of said bars and provided with laterally projecting stub axle members at their lower ends and laterally projecting crank arms at their upper ends, wheels journaled upon said stub axle members, a spacing bracket member secured to said axle members intermediate their ends and having a portion projecting rearward at right angles thereto, a stub tongue secured to said projecting portion, a truck tongue member including a bracket member having a vertically arranged sleeve portion whereby it is pivotally connected with said axle members, forwardly extending truck tongue members having their rear ends secured to said truck tongue bracket member and spaced apart in parallel relation and having their forward ends secured to a box bracket, said box bracket having a series of vertical openings through its lower wall spaced apart laterally relative to the line of draft, links having their rear ends pivotally connected with said crank arms and their forward ends converging, and a pin received by openings therein and one of said series of openings in the wall of said box bracket, whereby the angle of the path of said wheels may be varied to a limited extent in the same direction and in substantially parallel planes.

4. A tongue truck for implements including, in combination, relatively fixed axle members, vertically arranged shafts having bearings at opposite ends of said fixed axle members, laterally projecting stub axle members at the lower ends of said shafts and laterally projecting crank arms at the upper ends thereof, wheels journaled upon said stub axle members, a truck tongue member pivotally connected with said fixed axle members in a manner permitting it to swing laterally relative to the line of draft, links having their rear ends pivotally connected with said crank arms and their forward converging ends with said truck tongue member, the rear ends of said links being turned downward in a manner to contact with said crank arms and limit a swinging movement thereof.

5. A tongue truck for implements including, in combination, an implement stub tongue, relatively fixed truck axle members secured to the forward end of said stub tongue, vertically arranged shafts having bearings at opposite ends of said fixed axle members, said shafts having stub axles at their lower ends and crank arms at their upper ends, wheels journaled upon said stub axles, a truck tongue member having its rear end pivotally connected with said fixed axle members in a manner permitting it to swing laterally relative to the line of draft, a box bracket secured to the forward end of said truck tongue member, links having their rear ends pivotally connected with said crank arms and their forward converging ends pivotally connected with said box bracket in coaxial relation, said box bracket being provided with upper and lower laterally projecting ears upon opposite sides thereof and upon opposite sides of said truck tongue member, said ears having vertical openings therein, a draft evener supporting link having a vertical leg adapted to be received by said openings upon either side of said stub tongue, said link being arranged at substantially right angles with the line of draft, a draft member having its rear end secured to said stub tongue and means for securing its forward end to either end of one of said fixed axle members, whereby the associated draft members, including a supplemental draft bar having its rear end connected with the forward end of said draft evener and its forward end with the opposite end of said evener supporting link, may be transferred from one side of the stub tongue to the opposite side thereof.

CHARLES A. A. RAND.

Witnesses:
JOHN M. REGAN,
WM. KLOCKZIEN.

---

Copies of this patent may be obtained for five cents each, by addressing the "Commissioner of Patents, Washington, D. C."